UNITED STATES PATENT OFFICE.

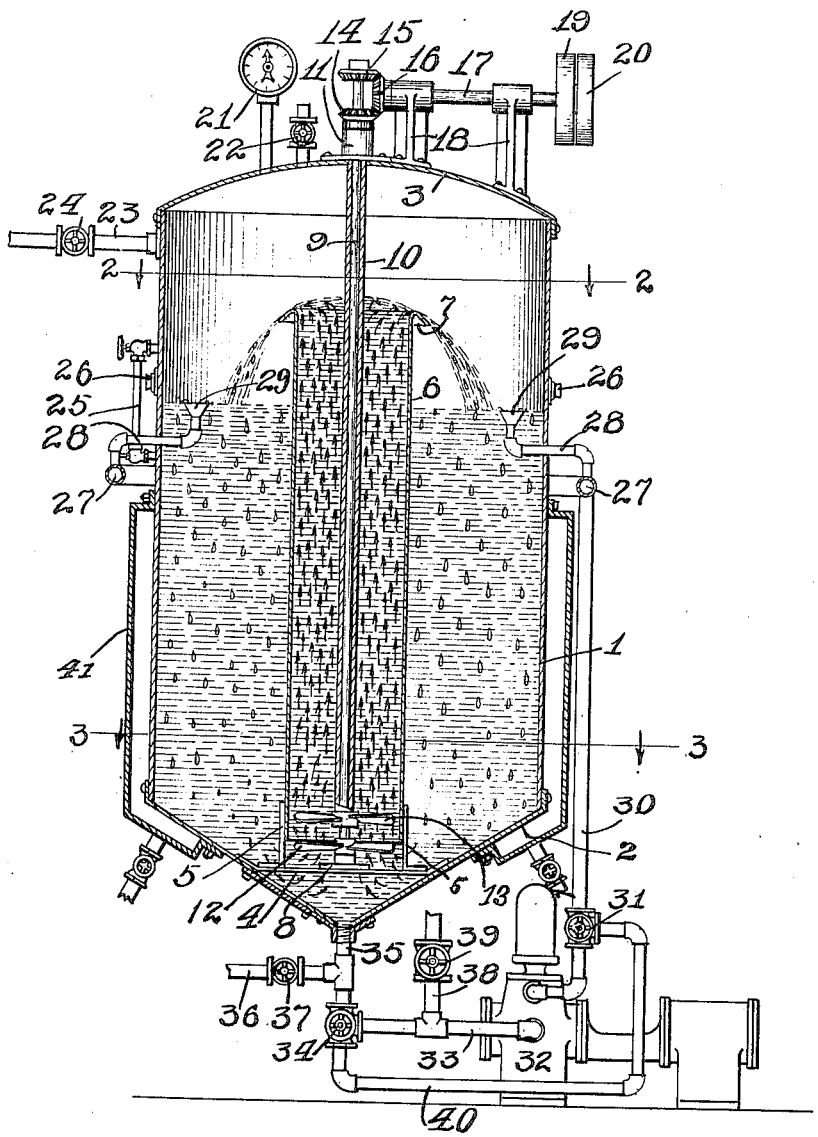

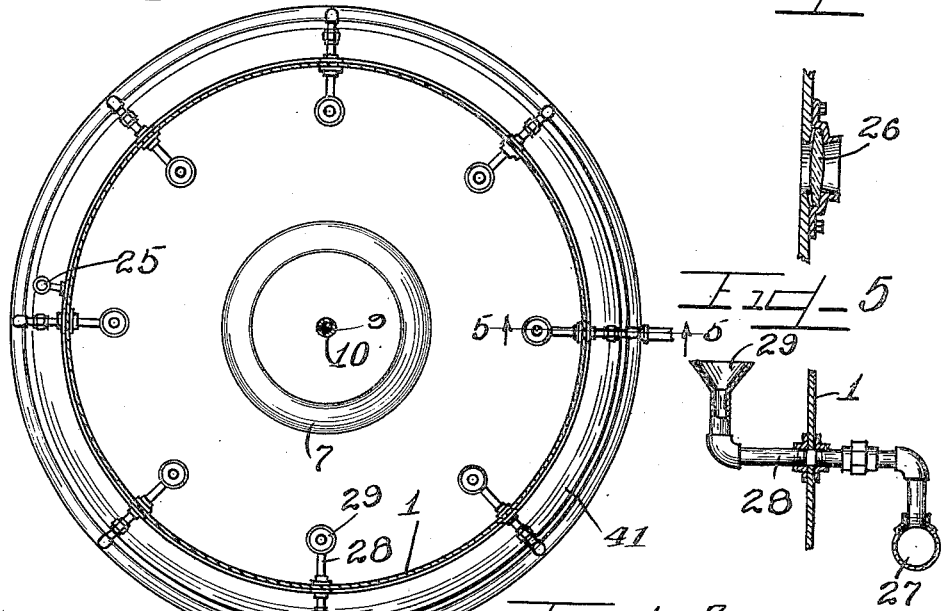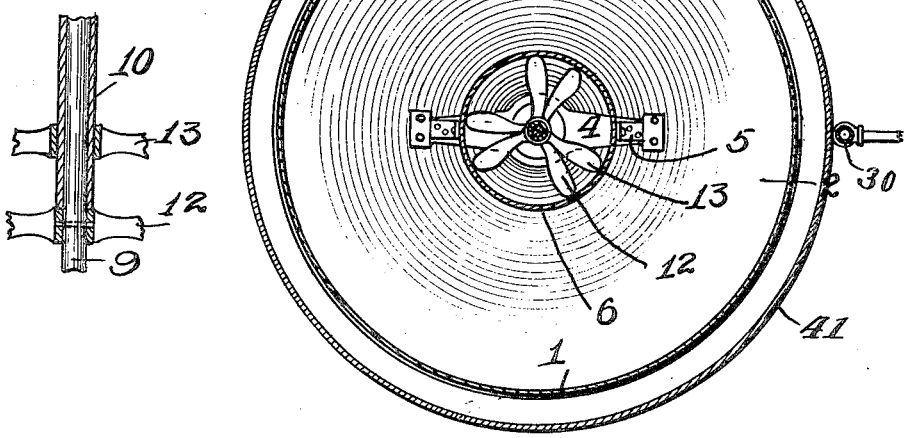

WILLIAM B. ALLBRIGHT, OF CHICAGO, ILLINOIS.

HYDROGENATING PROCESS.

1,404,708. Specification of Letters Patent. Patented Jan. 24, 1922.

Application filed June 28, 1915, Serial No. 36,739. Renewed September 22, 1920. Serial No. 412,085.

*To all whom it may concern:*

Be it known that I, WILLIAM B. ALLBRIGHT, a citizen of the United States, and a resident of the city of Chicago, in the county of Cook and State of Illinois, have invented certain new and useful Improvements in Hydrogenating Processes; and I do hereby declare that the following is a full, clear, and exact description of the same, reference being had to the accompanying drawings, and to the numerals of reference marked thereon, which form a part of this specification.

This invention relates to an improved process for effecting hydrogenation of oils, fats, fatty acids, their glycerids, and other esters, etc., by means of catalytic agents in an apparatus especially designed to effectuate the steps in the process. The process followed is along well known lines developed by previous investigators, but permits a new application of the principle by a new method of bringing about the reaction to cause hydrogenation to take place. The difficulty in application of the principles of hydrogenation involving the use of a catalyzer has been in bringing the substance to be hydrogenated and the hydrogen into close association with the catalyzer. By my invention, however, a continuous flow of the substance to be treated is effected in a manner to cause close association thereof with the catalyzer in the presence of the hydrogen, so that a rapid and positive saturation of the substance is assured.

An object of my invention is to improve upon the methods heretofore used by providing a positive means of exposing the oil or fat carrying in suspension a finely divided catalyzer, to the action of the hydrogen gas, and in a manner to overcome the difficulties heretofore encountered and further, to facilitate handling of the gas and oil to promote the progress of the process.

A further object of the invention is to provide means whereby the catalyzer is kept in suspension in the oil or fat more particularly by giving the bottom of the container a conical form and admitting hydrogen into the container at the apex of the conical bottom to agitate and mix with the oil or fat any catalyzer which may settle to the bottom of the container.

It is also an object of the invention to provide means for introducing bubbles of hydrogen into the oil or fat and subsequently breaking up the bubbles into smaller bubbles and disseminating these through the oil to produce the desired intimate contact between the oil and the hydrogen. This is especially important since it appears that the hydrogen reaches the catalyzer only through solution in the oil. Once the catalyzer is wetted with the oil there can no longer be any actual contact with the gas since the forces of adhesion effectively seal the catalyzer surface from the gas and no measure of agitation by ordinary mixing apparatus will dislodge the film of oil. Subdivision of the large bubbles and dissemination of the small bubbles through the oil does, however, greatly aid in maintaining a saturated solution of hydrogen in the oil in spite of the hydrogen taken from solution by the oil during its hydrogenation which occurs in the immediate vicinity of the catalyzer particles.

An important object of this invention is the construction of a hydrogenating mechanism wherein oils or fats to be treated are thoroughly mixed with a catalyzer within a container and induced to flow upwardly through a cylinder in a manner to prevent the formation of vortices or centrifugal action, after which the mixture flows into a hydrogen chamber within said container whereby the bubbling mixture is permitted to flow outwardly through skimming devices drawing gaseous hydrogen therewith through restricted passages and introducing the associated elements again into the main body of the mixture within the container, thus tending to set up a flow through a more or less confined passage, and thereby permitting the contents to again be spilled through the gas filled space back upon the surface of the main body of the associated elements to be drawn through the skimmers, drawing gaseous hydrogen therewith.

Another important object of this invention is the construction of an oil or fat hydrogenating mechanism wherein a container is provided with a cylinder which projects upwardly through a mixture to be treated into a hydrogen chamber, and is provided with devices operating in opposite directions to induce an upward flow in said cylinder without creating a centrifugal action, thus causing the elements to be spilled through the hydrogen chamber and out through skimmers to be returned into the field of operation of the moving devices.

I achieve the foregoing beneficial results pointed out by causing intimate association of the various elements entering into the reaction in several ways. By my improved process I cause a thorough intermixing of the material for treatment with the catalyzer, and hydrogen or hydrogen bearing elements, under different conditions of flow in a manner to prevent the formation of vortices or a centrifugal action which might possibly segregate the elements. My process also causes the gaseous hydrogen to be drawn through a thin bubbling layer of the material carrying the catalyzer in suspension and then causing the associated elements to flow through confined passages and introduced again into the main body of material. Upon introduction again into the main body of associated elements a flow is set up through a more or less confined passage, and the contents are then spilled through a gas filled space back upon the surface of the main body of associated elements.

This method involves the production of an upwardly moving current of intermixed elements by paddle wheels operating in opposite directions to prevent centrifugal action occurring, causing the elements to be spilled outwardly through a hydrogen gas filled space and then moving with the main body of elements downwardly and again into the field of operation of the paddle wheels, thus effecting complete distribution of the catalyzer through the material to be treated, together with a certain amount of the hydrogen. The object of setting up such a flow is chiefly to insure a complete admixture of the various constitutent elements, although a certain amount of hydrogenation is thereby caused to take place. Other means which operate to draw the hydrogen gas into a bubbling mass or small quantity of the substance having the catalyzer suspended therein and passing the same through confined passages to insure close association of the elements, produce the major portion of hydrogenation, or in other words increase the saturation of the substance.

A preferred form of apparatus for accomplishing the aforementioned results is shown in the accompanying drawings, of of which:—

Figure 1 is a sectional elevation of the apparatus.

Figure 2 is a sectional view taken on line 2—2 of Figure 1.

Figure 3 is a sectional view taken on line 3—3 of Figure 1.

Figure 4 is a sectional view of an eye piece provided in the side of the container or cylinder.

Figure 5 is a detail section taken on line 5—5 of Figure 2, with parts shown in elevation.

Figure 6 is a fragmentary sectional detail illustrating the connection of the propeller paddle wheels to the means for operating the same within the cylinder.

As shown in the drawings:

The apparatus consists of a cylinder or tank 1, having a conical bottom 2, and a dome shaped top 3. A cross-piece 4, is secured upon the conical bottom 2, having brackets 5, attached thereto, which serve to support a tall narrow cylinder 6, axially within said main cylinder 1, and the inner cylinder projects upwardly within said cylinder 1, to a height above the normal level of the liquid therein. The upper edge of said narrow cylinder 6, is flanged outwardly and downwardly, as indicated by the reference numeral 7, to afford a spillway for liquid flowing upwardly therethrough. Supported upon the bottom cross-piece 4, is a step bearing 8, in which is journalled the lower end of an axially disposed vertical shaft 9, and journalled around said shaft is a sleeve 10, which, together with said shaft, projects through a suitable stuffing box 11, mounted upon the top wall 3, of the apparatus. Secured upon the lower end of said shaft 9, is a propeller paddle wheel 12, and disposed directly thereabove and secured on the lower end of the sleeve 10, is another propeller paddle wheel 13, and the blades of said respective wheels are directed oppositely so that the same may rotate in opposite directions and yet act to direct a flow of the liquid upwardly within the inner cylinder 6. Secured upon the upper end of the sleeve 10, is a bevel pinion 14, and likewise secured upon the upper end of the shaft 9, is another bevel pinion 15, both of said bevel pinions meshing with a pinion 16, secured on the end of a shaft 17, which is journalled in bearings 18, mounted on the top wall of the tank or cylinder.

Tight and loose pulleys 19 and 20, respectively, are connected on the end of said shaft 17, to receive a belt whereby the shaft 17, may be driven or not, as desired. A pressure gauge 21, is connected to the top wall 3, of the tank and adjacent thereto is a pressure release or purge pipe provided with a valve 22, which, when opened, serves to permit discharge of undesirable gases. Communicating through the side walls of said cylinder or tank 1, is an inlet pipe 23, provided with a valve 24, whereby the hydrogen gas or other hydrogen containing fluid is admitted into the cylinder.

Also connected in the side walls of the tank by means of suitable valved connections for the purpose, is a gauge glass 25, whereby the level of the liquid within the tank may be ascertained.

For the purpose of viewing the operation as the process proceeds, eye pieces 26, are provided at various points in the side walls of the tank, a detail of construction of which is shown in Figure 4.

Surrounding said tank 1, is a circular manifold pipe 27, and communicating therewith and through the side walls of the tank 1, at a plurality of points, are pipes 28, which, on the interior of the tank 1, are provided with upwardly directed conical skimmer cups or mouth pieces 29, which, as the operation proceeds, are normally disposed just a trifle above the normal level of the liquid within the tank. An outlet pipe 30, leads from said circular manifold 27, downwardly through a three-way valve 31, into a power driven pump 32, and also communicating with said pump to receive the liquid passing therethrough is an outlet pipe 33, leading into a three-way valve 34, which is connected to an inlet pipe 35, leading into the conical bottom of the tank 1. Also communicating in said inlet pipe 35, by means of a T, is a drain pipe 36, provided with a valve 37. A supplementary pipe 38, is connected to said pipe 33, and is provided with a valve 39, for use in pumping the contents from the tank to filter presses or other suitable apparatus for further steps in the process. A by-pass pipe 40, is provided connected into the respective three-way valves 31 and 34, to by-pass the liquid around the pump when so desired. A heating jacket 41 for steam or hot water surrounds the container 1, as shown.

The purpose of the pump 32, is to cause a strong suction at the various cups 29, within the tank, thus drawing the gaseous hydrogen downwardly thereinto over thin films of the oil on the cups or skimmers 29, thence down through the pipe 30 while mixed with the oil and up through the inlet pipe 35, to mix with the liquid and its suspended catalyzer to intimately associate the various elements one with another and hasten the catalytic or hydrogenation action. The hydrogen is pumped from the pipe 35 into the catalyzer and oil in the form of large bubbles and as the pipe 35 is connected to the apex of the conical bottom 2 any catalyzer which may separate out falls toward the mouth of the pipe 35 and is carried upward by the hydrogen bubbles issuing therefrom into the cylinder 6. These large bubbles of hydrogen pass upwardly into the cylinder 6 and contact with the rapidly revolving paddle wheels or propellers 12 and 13 which subdivide them into fine bubbles and disseminate the fine bubbles so formed through the oil. The paddle wheels 12 and 13, serve to insure a rapid upward flow of the liquid within the inner cylinder 6, the liquid spilling over the upper edge thereof and progressing slowly downwardly in the main cylinder 1, to again flow upwardly within said inner cylinder 6, thus insuring a homogenous mixture of the substance to be treated and the catalyzer, and of course causing an intermixture therewith to some extent of the hydrogen gas.

The mechanical intermixture of the liquid and its suspended catalyzer with the hydrogen gases sets up a bubbling or splashing effect on the surface of the liquid in the tank 1, resulting in small quantities of the liquid intermittently spilling or splashing over the upper edges of said mouth pieces 29. Said small quantities or bubbling masses of liquid are continuously formed in the mouth pieces into which the hydrogen gases are drawn as said small quantities of the liquid and its suspended catalyzer are drawn downwardly through the mouth pieces 29, due to the suction of the pump 32, thereby providing a positive means for exposing oils, fats or other similar substances carrying in suspension a finely divided catalyzer, to the action of hydrogen gas.

Of course it is to be understood that any well known method of heating the contents of the tank may be utilized, and preferably a temperature somewhere between 150° and 200° is maintained. Of course, too, the process may be carried on at pressures below or above atmospheric, although the best results are obtained at pressures greater than atmospheric. This, however, may depend to a large extent upon the catalyte used.

I am aware that various details of construction may be varied through a wide range without departing from the principles of this invention, and I therefore do not purpose limiting the patent granted otherwise than necessitated by the prior art.

I claim as my invention:

1. The process of hydrogenating a substance by instituting a continuous flow without centrifugal effect to a mixture of substance and catalyzer, and drawing hydrogen from an atmosphere of hydrogen through which the mixture is spilled into small bubbling masses of the catalyzed substance.

2. The process of hydrogenating unsaturated fatty substance consisting in causing a mixture of the unsaturated substance and catalyzer to flow in a circuitous path and by forced suction drawing small quantities of the mixture downwardly through restricted passages causing the entrainment of hydrogen therewith from an atmosphere of hydrogen through which the mixture is spilled.

3. The process of hydrogenating unsaturated fatty substance consisting in causing a mixture of the unsaturated substance and catalyzer to flow in a circuitous path and spilled through an atmosphere of hydrogen, and by drawing the hydrogen into small quantities of the catalyzed substance.

4. The process of hydrogenating unsaturated fatty substance consisting in causing an associated catalytic and substance to flow without violent agitation at relatively great speeds in one direction to be spilled through an atmosphere of hydrogen and by forced suction drawing small quantities of the mixture and hydrogen into restrictive passages for slower movement in another direction.

5. The process of catalyzing a substance by mechanically intermixing the catalyzer therewith and by a forced suction drawing a gas over thin films of the substance, these thin films being constantly broken up and replaced.

6. The process of hydrogenating oil consisting in mechanically intermixing a catalyzer with the oil and by a forced suction drawing hydrogen over thin films of the oil, said thin films being constantly broken up and replaced.

7. The process of catalyzing a substance consisting in mixing the same with a catalyzer and then causing a rapid movement of the mixture together with a current of gas in a straight path, then spilling the mixture through an atmosphere of gas and finally causing a slow flow of the mixture through a circuitous path together with bubbles of gas.

8. The process of hydrogenating an oil consisting in mixing the oil with a catalyzer and then causing a rapid flow of the same through a straight path together with large bubbles of hydrogen, spilling the mixture through an atmosphere of hydrogen, drawing hydrogen gas over thin exposed films of the mixture while it is constantly agitated, and finally causing a slow flow of the mixture of catalyzer and oil through a circuitous path together with small bubbles of hydrogen.

9. The process of hydrogenating a substance including causing a continuous upward flow of the substance mixed with a catalyzer through a pipe without any centrifugal action and at the same time causing hydrogen gas in large bubbles to pass through the mixture, said bubbles being broken up by the action of the propelling means.

10. The process of hydrogenating a substance including mixing the substance with a catalyzing agent and passing the mixture in thin films over surfaces provided therefor and at the same time instituting a continuous renewal of the films by means of the action of hydrogen gas combined with mechanical force, after which the oil and catalyzer are drawn through a circuitous path by forced suction together with a quantity of bubbles of hydrogen.

11. The process of hydrogenating a substance including instituting a continuous flow without centrifugal effect to a mixture of the substance and a catalyzer, drawing hydrogen from an atmosphere of hydrogen through which the mixture is spilled and pumping the same through small bubbling masses of the catalyzer and substance while heat in regulated quantities is applied thereto.

12. The process of hydrogenating unsaturated fatty substances which includes causing a mixture of the unsaturated substance and a catalyzer to flow in separate paths, and by a forced suction drawing small quantities of the mixture over skimming devices and through restricted passages together with small bubbles of hydrogen.

13. The process of hydrogenating unsaturated fatty substances which includes causing a mixture of the unsaturated substance and a catalyzer to flow in two separate paths, one upward and one downward and by a forced suction drawing small quantities of the mixture through restricted passages together with small bubbles of hydrogen, said hydrogen being drawn from an atmosphere of hydrogen through which the mixture has previously been spilled at the end of its upward travel.

14. The process of hydrogenating unsaturated fatty substances which includes causing a mixture of the unsaturated substance and a catalyzer to flow in separate paths, and by a forced suction drawing small quantities of the mixture over skimming devices and through restricted passages together with small bubbles of hydrogen, said hydrogen being drawn from an atmosphere of hydrogen through which the mixture has previously been spilled, while heat in regulated quantities is applied to the mixture.

15. The process of hydrogenating oil which includes causing a mixture of hydrogen, oil and a catalyzer to flow in a straight path and to be spilled through an atmosphere of hydrogen, drawing hydrogen into small quantities of the mixture in small bubbles, and forcing hydrogen through a large mass of the mixture in large bubbles, together with the application of heat in regulated quantities thereto.

16. The process of hydrogenating oil including causing an oil and a catalyzer to flow without violent agitation at a relatively great speed in one direction, then to be spilled into an atmosphere of hydrogen, and finally drawn by forced suction through restricted passages in small quantities for slower movement in another direction.

17. The process of hydrogenating oil including causing an oil and a catalyzer to flow without violent agitation at a relatively great speed in one direction, then to be spilled into an atmosphere of hydrogen, and finally drawn by forced suction through restricted passages in small quantities for slower movement in another direction, while heat in regulated quantities is applied thereto.

18. The process of hydrogenating an oil which includes establishing a reservoir of oil and catalyzer mixed therewith, instituting a continuous rapid flow of the oil and catalyzer, pumping bubbles of hydrogen through the oil while in motion and through the oil in the reservoir, spilling the mixture of oil and catalyzer and hydrogen bubbles through an atmosphere of hydrogen which is maintained above the reservoir of oil and catalyzer, and applying heat in regulated quantities thereto.

19. The process of hydrogenating an oil including instituting a reservoir of oil mixed with catalyzer, causing a rapid flow of the catalyzer and the oil in one direction without centrifugal effect, then spilling the mixture of oil and catalyzer, together with large bubbles of hydrogen through an atmosphere of hydrogen into the reservoir, and finally drawing the mixture of oil and catalyzer, together with small bubbles of hydrogen, through restricted passages in small quantities in another direction along a circuitous path back into the reservoir.

20. The process of hydrogenating an oil which includes instituting a reservoir of the oil with which a catalyzer is mixed, causing a rapid flow of the catalyzer and the oil in one direction without centrifugal effect, then spilling the mixture of oil and catalyzer, together with large bubbles of hydrogen through an atmosphere of hydrogen into the reservoir, and finally drawing the mixture of oil and catalyzer, together with small bubbles of hydrogen, over skimming devices and through restricted passages in smaller quantities in another direction along a circuitous path back into the reservoir, while heat in regulated quantities is applied to the mixture in the reservoir.

21. The process of hydrogenating an oil which includes instituting a reservoir of the oil with which a catalyzer is mixed, causing a rapid flow of the catalyzer and the oil in one direction without centrifugal effect, then spilling the mixture of oil and catalyzer, together with large bubbles of hydrogen through an atmosphere of hydrogen into the reservoir, and finally drawing the mixture of oil and catalyzer together with small bubbles of hydrogen through restricted passages in smaller quantities in another direction along a circuitous path back into the reservoir, the quantities of oil and catalyzer which are pumped through said circuitous path entering the reservoir at the lowest portion thereof in order to effectively maintain all the catalyzer which is present in the oil in circulation at all times.

22. The process of hydrogenating an oil consisting in mixing the oil with a catalyzer and then causing a rapid flow of the same through a straight path together with bubbles of hydrogen, spilling the mixture through an atmosphere of hydrogen, drawing hydrogen gas over thin exposed films of the mixture while it is constantly agitated, and finally causing a slow flow of the mixture of catalyzer and oil through a circuitous path together with bubbles of hydrogen.

In testimony whereof I have hereunto subscribed my name in the presence of two subscribing witnesses.

WILLIAM B. ALLBRIGHT.

Witnesses:
CHARLES W. HILLS, Jr.,
EARL M. HARDINE.